US008756706B2

(12) United States Patent
Chidambaram et al.

(10) Patent No.: US 8,756,706 B2
(45) Date of Patent: Jun. 17, 2014

(54) METHOD FOR SECURING CREDENTIALS IN A REMOTE REPOSITORY

(75) Inventors: Avinash Chidambaram, Mississauga (CA); Matthew John Campagna, Ridgefield, CT (US)

(73) Assignees: BlackBerry Limited, Waterloo (CA); Certicom Corp., Mississauga (CA)

( * ) Notice: Subject to any disclaimer, the term of this patent is extended or adjusted under 35 U.S.C. 154(b) by 206 days.

(21) Appl. No.: 12/902,638

(22) Filed: Oct. 12, 2010

(65) Prior Publication Data

US 2012/0087493 A1  Apr. 12, 2012

(51) Int. Cl.
*H04L 29/00* (2006.01)

(52) U.S. Cl.
USPC ................ 726/28; 713/171; 380/44; 380/273

(58) Field of Classification Search
USPC ............................... 713/171; 380/23, 44, 273
See application file for complete search history.

(56) References Cited

U.S. PATENT DOCUMENTS

| | | | |
|---|---|---|---|
| 6,052,785 A | 4/2000 | Lin | |
| 6,826,686 B1 | 11/2004 | Peyravian et al. | |
| 6,950,943 B1 | 9/2005 | Bacha et al. | |
| 7,548,620 B2 * | 6/2009 | Popp | 380/273 |
| 2003/0182554 A1 * | 9/2003 | Gentry et al. | 713/171 |
| 2007/0006299 A1 | 1/2007 | Elbury | |
| 2007/0168656 A1 | 7/2007 | Paganetti | |
| 2007/0255943 A1 | 11/2007 | Kern | |

FOREIGN PATENT DOCUMENTS

WO  0122654 A1  3/2001

OTHER PUBLICATIONS

Examination Report mailed May 3, 2012; in corresponding European patent application No. 10187215.8.
Schneier B Ed—Schneier B. "Key Management", Jan. 1, 1996, Applied Cryptography: Protocols, Algorithms, and Source Code IN C, New York, NY: John Wiley & Sons, US, pp. 169-187, XP008133333, ISBN: 978-0-471-12845-8.
International Preliminary report on Patentability mailed Apr. 16, 2013, in corresponding PCT patent application No. PCT/US2011/055445.
International Search report and Written Opinion mailed May 7, 2012, in corresponding PCT patent application No. PCT/US2011/055445.
Maher, D.P.; "Cryptobackup and Key Escrow", Communications of the Association for Computing Machinery, ACM, New York, NY, US. vol. 39, No. 3, Mar. 1, 1996, pp. 48-53, XP000584954, ISSN: 0001-0782, DOI:10.1145/227234.227241.

\* cited by examiner

*Primary Examiner* — Brandon Hoffman
*Assistant Examiner* — Michael D Anderson
(74) *Attorney, Agent, or Firm* — Novak Druce Connolly Bove + Quigg LLP (57) ABSTRACT

A method of securing user credentials in a remote repository is provided. In accordance with one embodiment, there is provided a method comprising generating a first private key and a first public key pair from a registered password; generating a second private key and a second public key pair; generating a storage key from the second private key and the first public key; encrypting a set of credentials using the storage key; creating a encrypted credential signature from the encrypted set of credentials and the first private key; and storing the encrypted set of credentials, the encrypted credential signature, and the second public key in the remote repository.

16 Claims, 6 Drawing Sheets

METHOD FOR SECURING CREDENTIALS IN A REMOTE REPOSITORY

TECHNICAL FIELD

The present disclosure relates to the field of electronic credential management, and more particularly to the field of electronic credential management in a remote repository.

BACKGROUND

With an increasing number of services and information being made available through online networks, users are required to authenticate their identities and privileges through the use of electronic credentials. These credentials may include usernames, passwords, encryption keys, tokens, or any other information used in authorization or authentication processes.

These credentials are often stored locally on the computer or electronic device from which a user is accessing the associated services. When users reset or change electronic devices, they must re-enter or repopulate their credentials.

BRIEF DESCRIPTION OF THE DRAWINGS

Like reference numerals are used in the drawings to denote like elements and features.

DETAILED DESCRIPTION OF EXAMPLE EMBODIMENTS

In accordance with one aspect of the present disclosure, there is provided a method of securing user credentials in a remote repository. The method includes generating a first private key and a first public key pair from a registered password; generating a second private key and a second public key pair; generating a storage key from the second private key and the first public key; encrypting a set of credentials using the storage key; creating a encrypted credential signature from the encrypted set of credentials and the first private key; and storing the encrypted set of credentials, the encrypted credential signature, and the second public key in the remote repository.

In accordance with another aspect of the present disclosure, there is provided a method of authenticating a request to access user credentials in a remote repository, the remote repository having stored thereon a unique user identification (UID) and an authentication token generated from the UID and a password. The method includes receiving a user login identification and a first random number from a communication device; sending a second random number to the communication device; receiving a response token from the communication device, the response token having been generated from the first random number, the second random number, the user login identification and the password; generating a verification token from the first random number, the second random number, and the authentication token; and verifying the response token matches the verification token.

In accordance with yet another aspect of the present disclosure, there is provided a method of accessing secured user credentials in a remote repository. The method includes receiving an encrypted set of credentials, an encrypted credential signature, and a second public key from the remote repository; generating a first private key from a user-entered password; verifying the encrypted credential signature from the encrypted set of credentials and the first private key; generating a storage key from the first private key and the second public key; and decrypting the encrypted set of credentials using the storage key.

Figure 1:
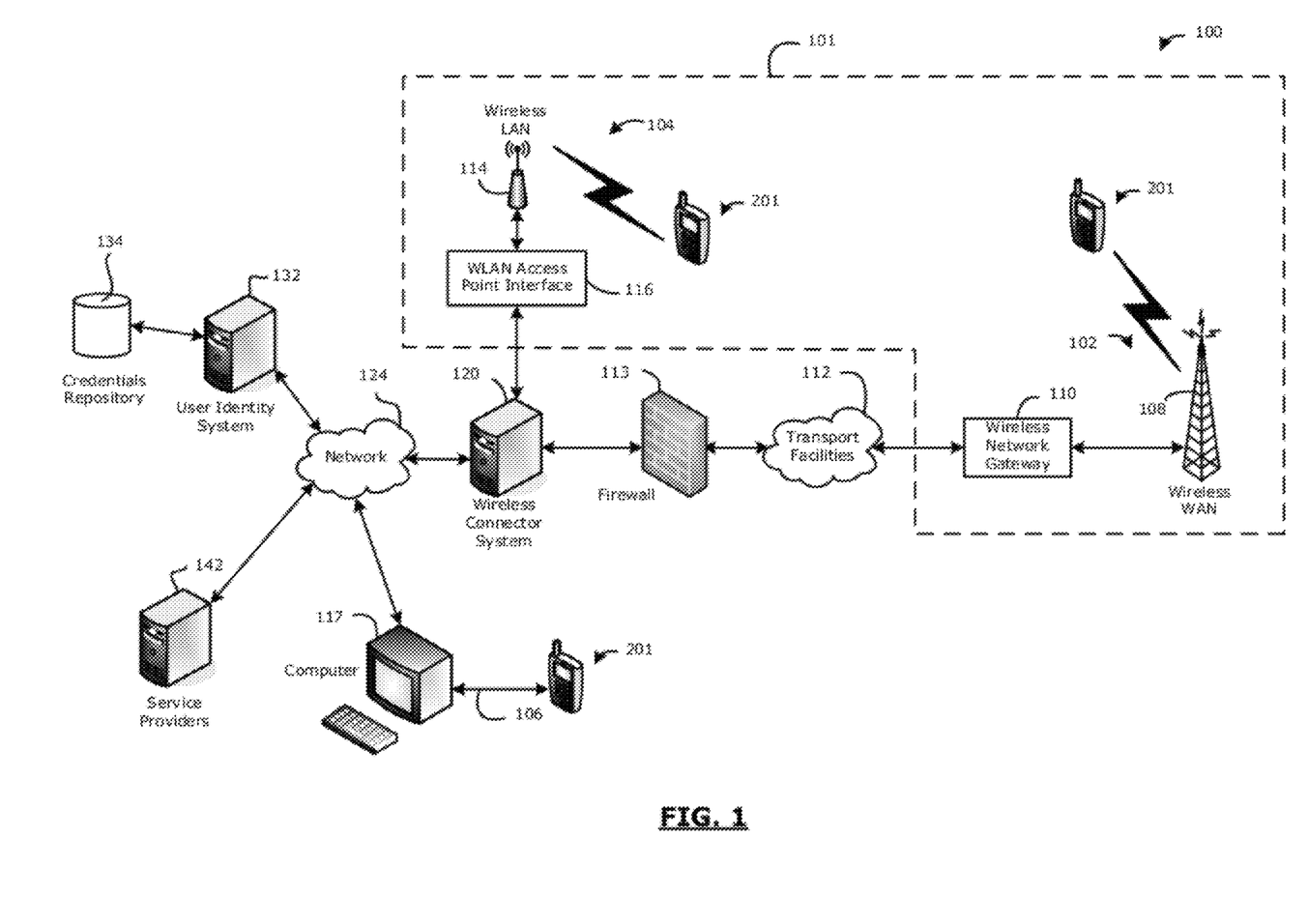
FIG. 1 is a block diagram illustrating a communication system including a mobile communication device in which example embodiments of the present disclosure can be applied.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a user identity server 132, and service providers 142. The service providers 142 may comprise a content server for providing content such as internet content or content from an organization's internal servers, an application server for implementing server-based applications such as email, or any other system for providing services. When accessing these service providers 142, a user may be required to enter or send credentials stored on his communication device to authenticate his identity and privileges associated with the service provider. In some embodiments, the communication device 201 may require certain credentials to just access the network 124 on which the service providers 142 reside.

In accordance with one aspect of the present disclosure, the user identity server 132 is configured to secure users credentials and to authenticate communication devices 201. In at least one embodiment, the user identity server 132 is implemented through computer program instructions that reside on a persistent storage on a computer system or server, and which are executed by one or more microprocessors. In some embodiments, the user identity server 132 is implemented on the same computer as a service provider 142.

In an example embodiment, the user identity server 132 can communicate and exchange messages with mobile devices over the communication system 100 using any of the example mobile device connections illustrated in FIG. 1 or any other connection means suitable for exchanging messages with a mobile device. In some embodiments, the user identity server 132 is configured to send and receive messages for authentication, or to upload or download credentials. In some embodiments, these messages may be signed, encrypted or otherwise secured.

In some embodiments, the user identity server 132 is communicably connected to a credentials repository 134. In some examples, the credentials repository 134 comprises credential information associated with a unique user identification. This information may include encrypted credentials, timestamps, signatures, encryption keys or any other data that may be stored in association with encrypted information. The user identity server communicates with the credentials repository to upload and download credential information.

In FIG. 1, the user identity server 132 is illustrated as being directly connected to a credentials repository 134; however, in some embodiments, the credentials repository 134 may reside on the same system or computer as the user identity server 132. In other embodiments, the credential repository 134 may be situated at a different location on the network. In some embodiments, there may be multiple credentials repositories on the network all communicably connected to the user identity server 132.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the user identity server 132, service providers 142 or other connected computers 117. Conversely, the wireless connector system 120 sends data packets received, for example, from the user identity server 132 or service providers 142 to the wireless network gateway 110 which then transmit the data packets to the destination mobile device 201. The AP interfaces 116 of the WLAN 104 provide similar sending functions between the mobile device 201, the wireless connector system 120 and network connection point such as a content server, an application server or any other service provider 142.

The network 124 may comprise a private local area network, metropolitan area network, wide area network, the public internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be required. Computers 117 may be of any suitable construction and include at least a processor, and a display screen, one or more user input devices, and a memory each connected to the processor. The computers 117 could be desktop computers, laptop/notebook/netbook computers, or combinations thereof, and may have wired or wireless communication subsystems for connecting to the network 124.

A mobile device 201 may alternatively connect to the wireless connector system 120 using a computer 117 via the network 124. In at least some embodiments, for security purposes the computers 117 with which the mobile devices 201 can connect to the wireless connector system 120 are limited to computers 117 which are directly connected to the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system are intended to fall within the scope of the present disclosure.

Figure 2:
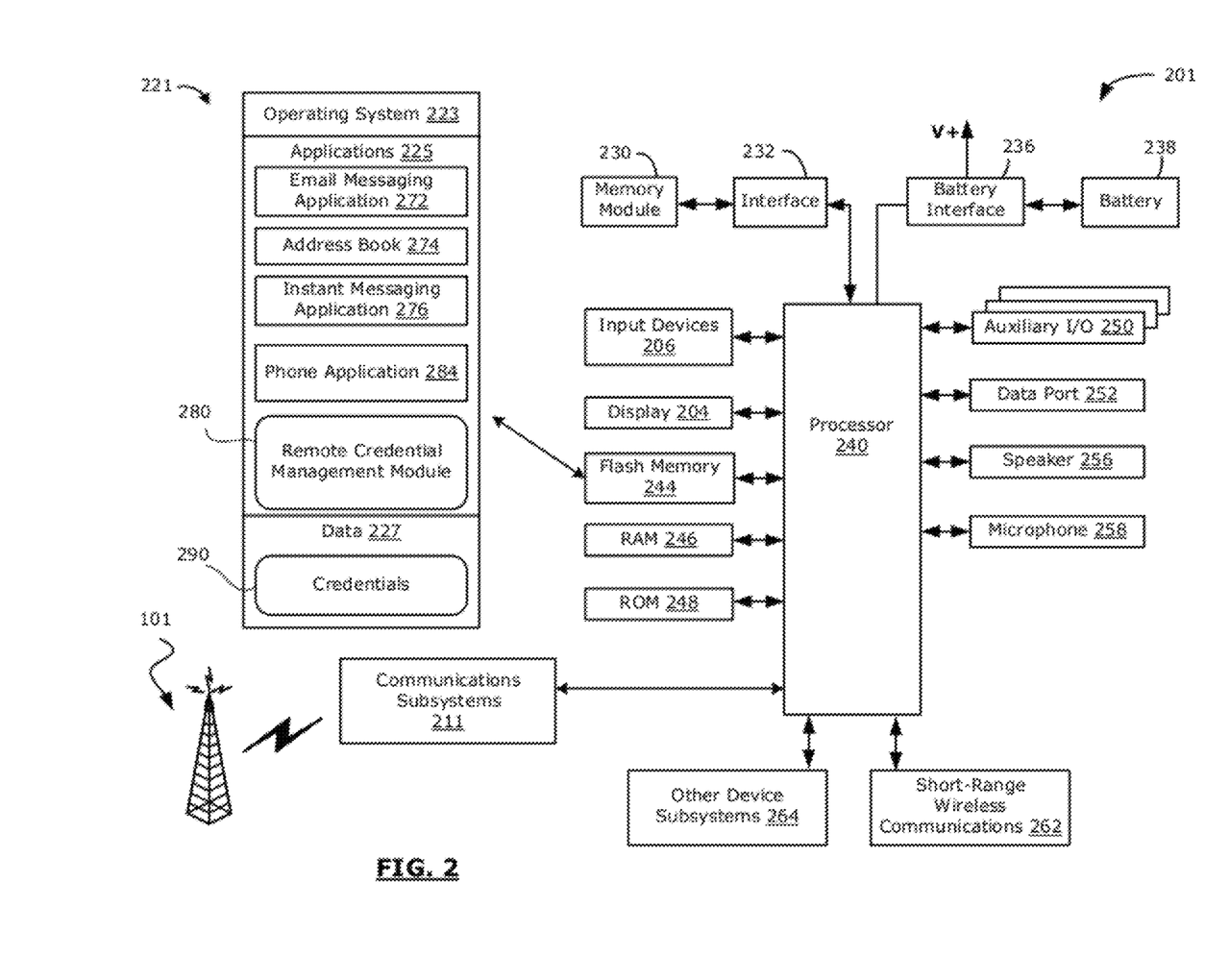
FIG. 2 is a block diagram illustrating a mobile communication device in accordance with one example embodiment of the present disclosure.

Reference is now made to FIG. 2 which illustrates a mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The mobile device 201 may communicate with any one of a plurality of fixed transceiver base stations 108 (FIG. 1) of the wireless network 101 within its geographic coverage area. The mobile device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223 and software applications 225, which may include an email messaging application 272, an address book 274, an instant messaging application 276, a phone application 284, and remote credential management module 280. In some example embodiments, the functions performed by each of the applications 272, 274, 276, 284 and 280 may each be realized as a plurality of independent elements, and any one or more of these elements may be implemented as parts of other software applications 225. In some example embodiments, one or more applications 225 are configured to exchange authorization messages and user credentials with a user identity server 132 (FIG. 1).

For illustration purposes, FIG. 2 shows a remote credential management module 280. In some example embodiments, the remote credential management module 280 may be configured to generate various encryption keys, create digital signatures, and generate various authentication tokens.

In some embodiments, the remote credential management module 280 may be further configured to exchange authentication messages and tokens, and once authenticated to exchange credential information with the user identity server 132.

Although the remote credential management module 280 is shown as an individual module or application, in many embodiments the functions of the remote credential management module 280 described above and detailed further below may be implemented within individual applications, such as the email messaging application 272 or within the operating system 223 and not necessarily using a separate module or application. The present application contemplates all such implementations.

The software modules 221 or parts thereof may be temporarily loaded into volatile memory such as the RAM 246. The RAM 246 is used for storing runtime data variables and other types of data or information. Although specific functions are described for various types of memory, this is merely one example, and different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card 230 (typically comprising flash memory) and a memory card interface 232. Network access typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The data 227 stored in memory (volatile or non-volatile) may include user credentials 290. In some embodiments, the user credentials 290 comprise data relating to the user's identities, permissions and privileges associated with various services to which the mobile device 201 connects. For example, the user credentials may include usernames, passwords, encryption keys, tokens, or other information associated with the verification of identities and privileges.

In some embodiments, some of the user credentials 290 may be sent or received by the remote credential management module 280 to or from a user identity server 132 using one of the methods described herein.

The serial data port 252 may be used for synchronization with a user's host computer system (not shown). The serial data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable or Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both.

For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

Figure 3A:
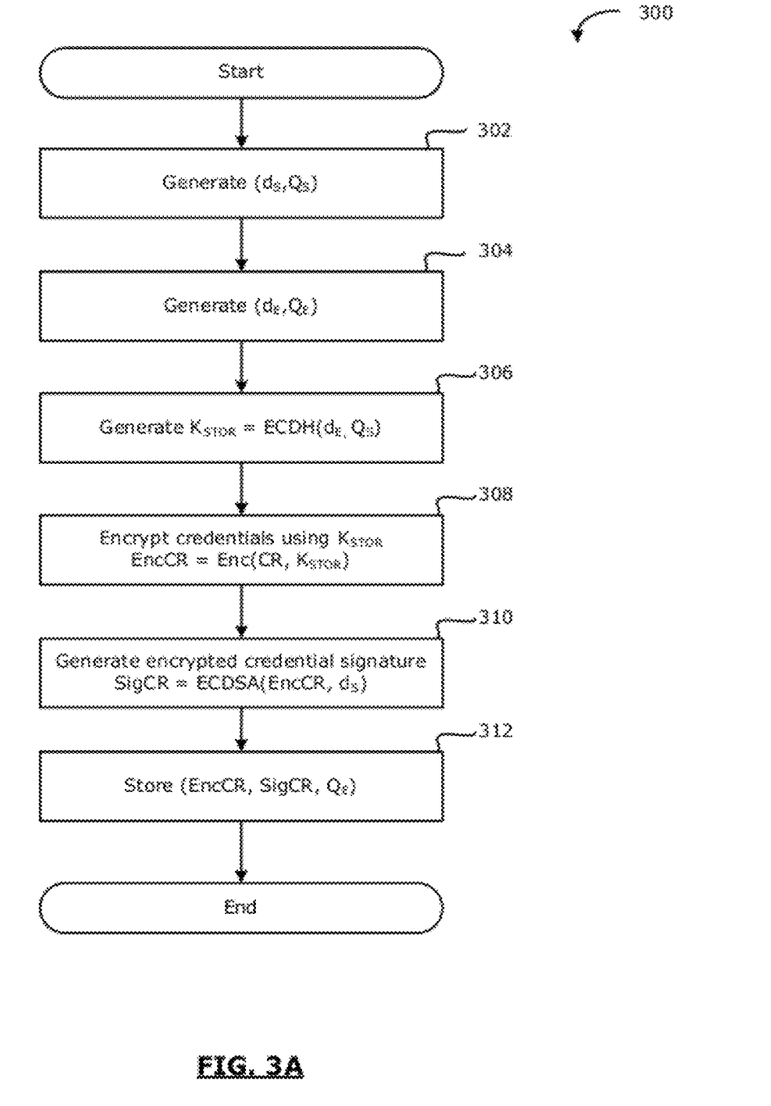
FIG. 3A is a flowchart illustrating an example method of securing user credentials in accordance with one example embodiment of the present disclosure.
Figure 3B:
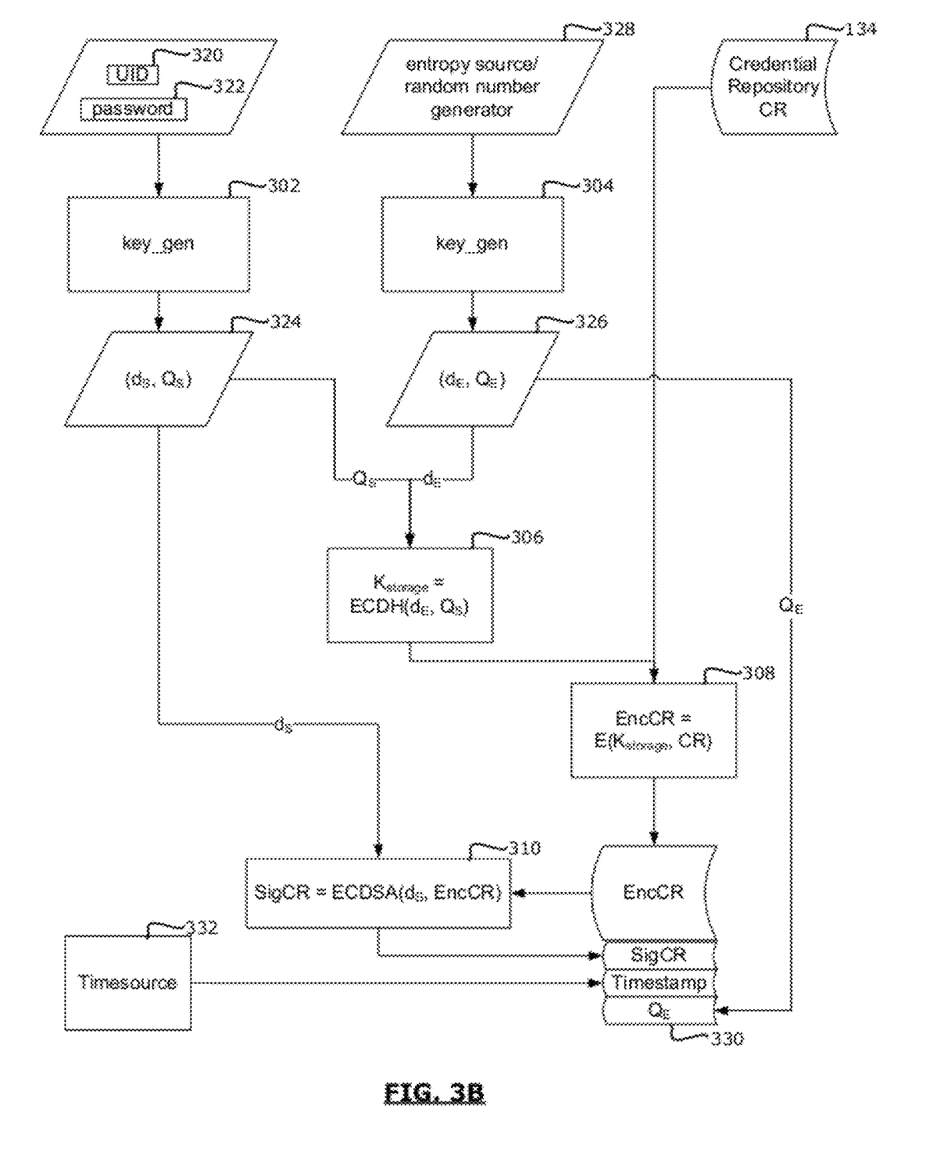
FIG. 3B is a flowchart illustrating an example data flow for an example method of securing user credentials in accordance with one example embodiment of the present disclosure.

Reference is now made to FIGS. 3A and 3B. FIG. 3A shows, in flowchart form, a method 300 of securing user credentials in a remote repository, and FIG. 3B illustrates an example data flow for the method 300.

The examples described herein use the language of static key pairs and ephemeral key pairs as commonly used in cryptography. A static key is commonly associated with an identity or device and may be certified by a public key infrastructure. An ephemeral key is commonly generated on the fly and is only used for a single session. Generally, ephemeral denotes a lack of need to store the private key.

While the examples below describe static and ephemeral keys, these terms are used by way of example, and are not limiting to the type of public/private key pairs that can be used.

Before the method 300 begins, a user registers with the user identity server 132 a password 322 and a unique user identification (UID) 320. The password 322 can be any string of characters that can be used to generate an encryption key. The UID 320 is a unique identifier such as an email address, username or any other identifier that has not already been used in the user identity server 132.

On a periodic or user-triggered basis, the current set of credentials 290 stored on a device 201 can be backed-up, migrated or simply secured into a credentials repository 134. The method 300 begins at event 302 with the generation of a static private key $d_S$ from the user's password 322. The static private key $d_S$ may be generated using any function such as a hash function, and in some embodiments may combine other user information such as a UID.

In some embodiments, the static public key $Q_S$ is generated from the static private key $d_S$. In elliptic curve cryptography (ECC), $Q_S = d_S G$ wherein G is a point $(x_G, y_G)$ on an elliptic curve satisfying the equation $y^2 = x^3 + ax + b$ where a and b are constants. The details of standard elliptic curve cryptology can be found in the Standards for Efficient Cryptograph Group's Standards for Efficient Cryptography 1: Elliptic Curve Cryptography (SEC1). $d_S$ and $Q_S$ form a static public/private key pair 324.

At event 304, an ephemeral public/private key pair $(d_E, Q_E)$ 326 is also generated using elliptic curve cryptography. In some embodiments, the ephemeral private key $d_E$ is a random or pseudo-random number, and may be generated from an entropy source or a random number generator 328.

At event 306, a storage key $K_{STOR}$ is generated from the private ephemeral key $d_E$ and the public static key $Q_S$ using the elliptic curve Diffie-Hellman (ECDH) scheme.

At event 308, the storage key $K_{STOR}$ is used to encrypt a set of credentials CR stored on the communication device 201.

At event 310, a signature SigCR for the encrypted credentials is generated with the static private key $d_S$ using a digital signature algorithm. In some embodiments, the signature used is the elliptical curve digital signature algorithm (ECDSA) as described in the aforementioned SEC1.

At event 312, the encrypted set of credentials EncCR, the signature SigCR, and the public ephemeral key $Q_E$ are stored in the credentials repository 134 in conjunction with the user's UID. In some embodiments, the information stored in the credentials repository 134 further comprises timestamps or version information which may be generated from a time-source 332 or a revision management system. In some embodiments, the encrypted set of credentials EncCR, the signature SigCR, the public ephemeral key $Q_E$, and the optional timestamp or version information may be stored in the credentials repository 134 together as a tuple 330.

Figure 4:
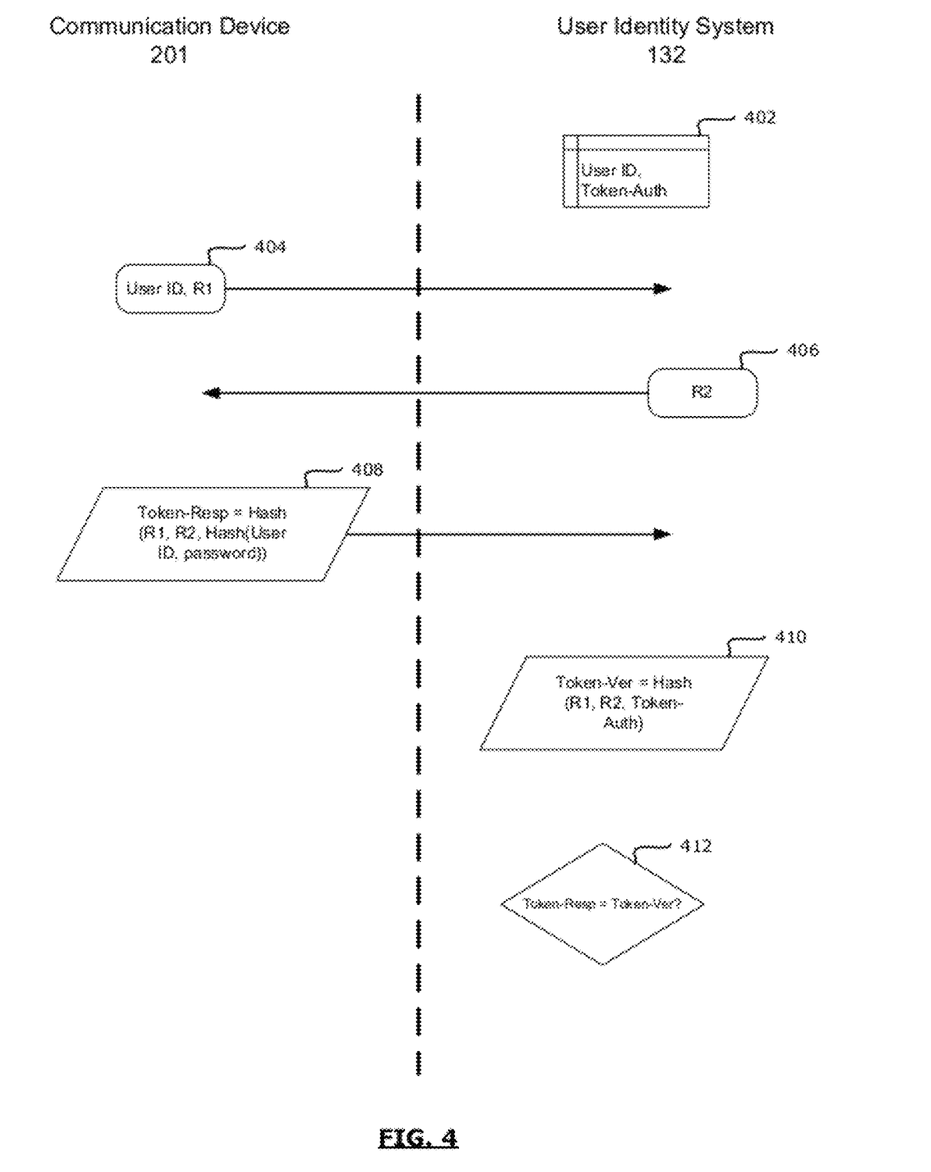
FIG. 4 is a flowchart illustrating an example method of authenticating a request to access user credentials in a remote repository in accordance with one example embodiment of the present disclosure.

When a communication device 201 wishes to access or update the credentials stored in the credentials repository 134, the communication device 201 must first authenticate its identity to the user identity server 132 by the example method illustrated in FIG. 4. Prior to the communication device's request, the user's unique identification (UID) and an authentication token are registered 402 with the user identity server 132. The authentication token is created from a hash of the UID and the password.

At event 404, the communication device 201 sends an access request to the user identity server 132 with the UID and a random number R1. The user identity server 132 responds at event 406 by challenging the communication device with a second random number R2.

At event 408, the communication device 201 generates a response token and sends it to the user identity server 132. The response token is generated from the hash of the two random numbers (R1 and R2) and the hash of the UID and password.

At event 410, the user identity server 132 generates a verification token from the hash of the two random numbers (R1 and R2) and the authentication token.

If the response token and the verification token match 412, the communication device 201 is authenticated and is permitted to access the secured user credentials.

Figure 5:
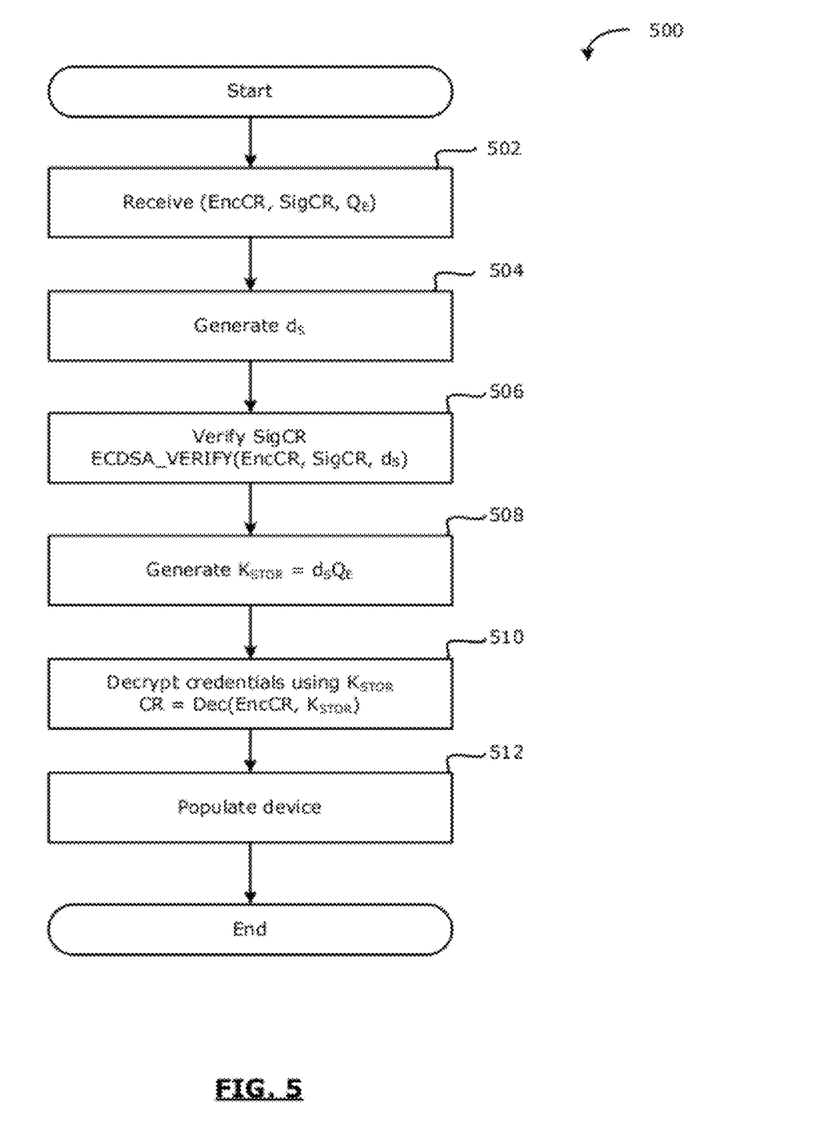
FIG. 5 is a flowchart illustrating an example method of accessing secured user credentials in a remote repository in accordance with one example embodiment of the present disclosure.

Once authenticated, the user can access the credential information stored on the credentials repository 134 as illustrated in FIG. 5. At event 502, the user can receive encrypted credentials, signatures, public ephemeral keys and any other information associated with the user's UID.

At event 504, the private static key $d_S$ can be re-generated from the user's password by using the technique utilized to generate $d_S$ at event 302.

At event 506, the private static key $d_S$ is used to verify the signature SigCR of the encrypted set of credentials EncCR. In some embodiments, the signature verification used is the elliptical curve digital signature algorithm (ECDSA) verification function.

At event 508, the storage key $K_{STOR}$ is re-generated from the static private key $d_S$ and the public ephemeral key $Q_E$ using the elliptic curve Diffie-Hellman (ECDH) scheme. This storage key is identical to the storage key initially generated to encrypt the credentials as illustrated by the following equation:

$$K_{STOR}=d_S Q_E=d_S d_E G=d_E d_S G=d_E Q_S$$

At event 510, the encrypted set of credentials EncCR is decrypted using the storage key $K_{STOR}$.

At event 512, the communication device 201 can be populated with the credentials. In some embodiments, the entire set of credentials can be populated onto the device 201, while in other embodiments, the user may populate the device 201 with selected credentials only.

While the present disclosure is primarily described in terms of methods, the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon. It is understood that such apparatuses or articles of manufacture, also come within the scope of the present disclosure.

The various embodiments presented above are merely examples and are in no way meant to limit the scope of this disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of securing user credentials in a remote repository by a communication device, the method comprising:
    generating, from a password, using an elliptic curve cryptography scheme, a first private key and a first public key pair;
    generating a second private key and a second public key pair;
    generating a storage key from the second private key and the first public key;
    encrypting a set of credentials using the storage key;
    creating an encrypted credential signature from the encrypted set of credentials and the first private key; and
    sending the encrypted set of credentials, the encrypted credential signature, and the second public key to the remote repository,
    wherein the set of credentials include one or both of a user identification (user ID) or a credential password.

2. The method of claim 1 wherein generating the second private key and the second public key pair utilizes the elliptic curve cryptography scheme.

3. The method of claim 1 wherein generating the storage key from the second private key and the first public key utilizes an elliptic curve Diffie-Hellman scheme.

4. The method of claim 1 wherein creating an encrypted credential signature from the encrypted set of credentials and the first private key utilizes an elliptic curve digital signature algorithm.

5. The method of claim 1 wherein the first private key and first public key pair are a static key pair, and the second private key and second public key pair are an ephemeral key pair.

6. A communication device for securing user credentials in a remote repository, the communication device comprising:
    a processor;
    memory; and
    an encryption module which, when executed by the processor, configures the processor to
        generate, from a password, using an elliptic curve cryptography scheme, a first private key and a first public key pair;
        generate a second private key and a second public key pair;
        generate a storage key from the second private key and the first public key;
        encrypt a set of credentials using the storage key;
        create an encrypted credential signature from the encrypted set of credentials and the first private key; and
        send the encrypted set of credentials, the encrypted credential signature, and the second public key to the remote repository,
        wherein the set of credentials include one or both of a user identification (user ID) or a credential password.

7. A communication device for accessing secured user credentials in a remote repository, the communication device comprising:
    a processor;
    memory; and
    a remote credential management module which, when executed by the processor, configures the processor to
        receive an encrypted set of credentials, an encrypted credential signature, and a second public key from the remote repository,
        wherein the set of credentials include one or both of a user identification (user ID) or a credential password;
        generate a first private key from a password using an elliptic curve cryptography scheme;
        verify the encrypted credential signature from the encrypted set of credentials and the first private key;
        generate a storage key from the first private key and the second public key;
        decrypt the encrypted set of credentials using the storage key; and
        populate the device with the unencrypted set of credentials.

8. The communication device of claim 6 wherein generating the second private key and the second public key pair utilizes the elliptic curve cryptography scheme.

9. The communication device of claim 6 wherein generating the storage key from the second private key and the first public key utilizes an elliptic curve Diffie-Hellman scheme.

10. The communication device of claim 6 wherein creating an encrypted credential signature from the encrypted set of credentials and the first private key utilizes an elliptic curve digital signature algorithm.

11. The communication device of claim 6 wherein the first private key and first public key pair are a static key pair, and the second private key and second public key pair are an ephemeral key pair.

12. The communication device of claim 7 wherein generating the second private key and the second public key pair utilizes the elliptic curve cryptography scheme.

13. The communication device of claim 7 wherein generating the storage key from the second private key and the first public key utilizes an elliptic curve Diffie-Hellman scheme.

14. The communication device of claim 7 wherein creating an encrypted credential signature from the encrypted set of credentials and the first private key utilizes an elliptic curve digital signature algorithm.

15. The communication device of claim 7 wherein the first private key and first public key pair are a static key pair, and the second private key and second public key pair are an ephemeral key pair.

16. A server for securing user credentials in a remote repository, the server comprising:
   a processor;
   memory; and
   an encryption module which, when executed by the processor, configures the processor to
      generate, from a password, using an elliptic curve cryptography scheme, a first private key and a first public key pair;
      generate a second private key and a second public key pair;
      generate a storage key from the second private key and the first public key;
      encrypt a set of credentials using the storage key;
      create an encrypted credential signature from the encrypted set of credentials and the first private key; and
      send the encrypted set of credentials, the encrypted credential signature, and the second public key to the remote repository,
   wherein the set of credentials include one or both of a user identification (user ID) or a credential password.

* * * * *